Patented Jan. 26, 1937

2,068,824

UNITED STATES PATENT OFFICE 2,068,824

QUATERNARY HETEROCYCLIC ACID AMIDE COMPOUNDS AND MAUNFACTURE THEREOF

Fritz Schönhöfer and Hans Henecka, Wuppertal-Elberfeld, Germany, assignors to Winthrop Chemical Company, Inc., New York, N. Y., a corporation of New York No Drawing. Application August 5, 1932, Serial No. 627,676. In Germany August 18, 1931

17 Claims. (Cl. 260—41)

This invention relates to new therapeutically active media and to a process of preparing the same.

In accordance with our invention new therapeutically active media which display a remarkable efficiency against blood parasites are obtainable by the synthesis of heterocyclic amino compounds a cylically bound nitrogen atom of which is present in its quaternary form and to the amino group of which a ring carbon atom of a substituted benzene nucleus is attached by means of the radical of carbonic or thiocarbonic acid. Accordingly, the group of new therapeutically active compounds discovered by us and characterized by the above indicated groupings may be represented by the general formula:

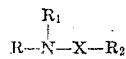

In this formula R stands for the heterocyclic nucleus containing nitrogen in quaternary heterocyclic linkage, N is attached to a ring carbon atom of the nucleus representing R, $R_1$ stands for hydrogen, alkyl, aralkyl or X, the second linkage of which latter is then connected with $R_2$, $R_2$ stands for a substituted benzene nucleus and X stands for a divalent acid radical selected from the group consisting of—CO—and—CS—which radical is attached to a ring carbon atom of the benzene radical representing $R_2$ The heterocyclic nuclei containing nitrogen in quaternary heterocyclic linkage may be represented, for instance, by mono-, bi- or tricyclic compounds, such as imidazole, pyridine, acridine, piperidine, pyrimidine, pyrazole, benzimidazole, quinoline, isoquinoline and phenanthroline compounds. Accordingly, the term "heterocyclic" is used in this specification and in the appended claims as including also such heterocyclic compounds which contain, combined with a heterocyclic necleus, carbocyclic nuclei. We prefer the use of the quaternary quinoline radical of the general formula:

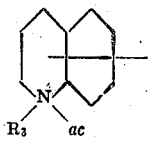

wherein $R_3$ stands for alkyl or aralkyl, for instance, methyl, ethyl, isopropyl, allyl, hydroxypropyl, oxopropyl and benzyl, and ac stands for an acid radical usual in quaternary nitrogen salts, such as the radical of sulfuric, monoalkylsulphonic, hydrohalic, for instance, hydrochloric, hydrobromic or hydroiodic acid, but also other acid radicals, such as the toluene sulfonic acid or the acetyl radical may be the acid salt forming component attached to the quaternary nitrogen atom.

The substituent $R_1$ of the amino group, which latter is attached to a ring carbon atom of the heterocyclic radical R, will in general be hydrogen; however, the hydrogen may be replaced by alkyl groups, such as the methyl, ethyl, propyl, isopropyl, allyl or isoamyl group or by aralkyl groups, such as the benzyl radical, without remarkable change of the general character particularly of the therapeutic activity of our new products.

The benzene radical representing $R_2$ always must be substituted so that the product displays the above-mentioned therapeutic activity on blood parasites. As substituents of the benzene radical those monovalent groups usual in the art as substituents of cyclic radicals, have proved operable, for instance, alkyl groups, such as the methyl, ethyl, isopropyl, allyl and crotyl group, aralkyl, alkoxy or phenoxy groups, the nitro, amino, alkylamino, aminoalkylamino, acylamino, such as the acetyl- or benzoylamino group, furthermore halogen atoms hydroxy groups and carboxyl groups. These substituents must be attached to a ring carbon atom.

From the above explanations it follows that many variations within the new group of therapeutically active compounds are possible provided that always those groupings which characterize the said new group of therapeutically active compounds are present, namely the heterocyclic radical containing cyclically bound quaternary nitrogen, to a ring carbon atom of which heterocyclic radical an amino group is attached which latter is connected in amide-like linkage by means of the radical of the carbonic or thiocarbonic acid with a ring carbon atom of a substituted benzene radical. Within the said group of compounds the compounds of the probable formula:

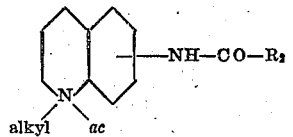

wherein $R_2$ stands for a substituted phenyl group has proved practically especially useful.

Above we have indicated those characteristics of our new products which are considered to be responsible for their therapeutic action on blood parasites. It will be obvious to those skilled in the art that other substituents may be present without alteration of the essential activity of our new products. For instance, the cyclically bound quaternary nitrogen atom and the acid-amide-like bound amino group may be present more than once. Further substituents may be introduced into the new compounds subsequently, for example, by the known methods of nitration, alkylation or acylation. Accordingly, this invention is not restricted to those products merely containing the above-mentioned characteristic groups, but is intended to include also compounds containing substituents, such as alkyl, alkoxy, phenyl, nitro, amino, acylamino, halogen and hydroxy groups. Such substituents, in general, do not essentially change the character of our new compounds.

Our new compounds are in general white to yellowish colored crystallized compounds soluble in water and mono- and polyvalent liquid alcohols, slightly soluble in benzene, nitrobenzene, ether and chloroform.

In accordance with our invention the above described new products are obtained by reacting upon a compound of the general formula:

$$Y-N-X-R_2$$
$$\phantom{Y-N}|\phantom{-X-R_2}$$
$$\phantom{Y-N-X}R_1$$

with an alkylating agent, while heating. In this formula Y stands for a heterocyclic ring system containing at least one cyclically bound trivalent nitrogen atom, and the N is attached to a ring carbon atom of the ring system representing Y. $R_1$, $R_2$, and X represent the same groups as indicated above for the same symbols, namely $R_1$ stands for hydrogen, alkyl, aralkyl or X, the second linkage of which latter is then attached to $R_2$, $R_2$ stands for a benzene radical at least once substituted by a monovalent substituent, and X for a divalent acid radical selected from the group consisting of —CO— and —CS— which radical is attached to a ring carbon atom of the benzene radical $R_2$.

As alkylating agents have proved operable in our new process those compounds normally used as alkylating agents in the art, that is, alkyl- and aralkyl-halides, such as methyl iodide or bromide, ethyl, propyl, or isopropyl iodide, allyl or benzyl-chloride or bromide, or the corresponding arylsulfonates. We prefer the use of dialkyl- or di-aralkyl-sulfates, such as dimethyl-, diethyl-, di-(β-oxopropyl)-, diallyl-, dicrotyl-, diisoamyl-, dicyclopentyl-, dicyclohexyl- and dibenzyl-sulfates as the alkylating agent. All the said alkylating agents are intended to be included when using the term "alkylating agent" in the appended claims. The alkylating process is carried out while heating the reacting components preferably in the presence of an indifferent organic solvent, such as benzene, chlorobenzene, nitrobenzene and tetrahydronaphthalene to a temperature ranging from about 80 to about 200° C. Generally a temperature of about 120° C. will be sufficiently high for the alkylating process. In general we prefer the use of dialkylsulfates as alkylating agent even in those cases in which a quaternary halide is finally desired. In such cases the quaternary alkylsulfate salts primarily formed are subsequently converted into the corresponding halide salts, for example, by precipitating the quaternary halide salt from the aqueous solution of the corresponding alkylsulfate salt by the addition of a concentrated alkali halide solution.

Our new compounds are likewise obtainable by connecting a primary or secondary amino group attached to the heterocyclic nucleus containing at least one cyclically bound quaternary nitrogen atom, with a benzene nucleus, containing at least one monovalent substituent attached to the nucleus, by means of the radical of carbonic or thiocarbonic acid, while reacting upon the said compound containing a primary or secondary amino group with a halide or anhydride of a benzene carboxylic or thiocarboxylic acid at least once substituted in the nucleus by a monovalent substituent. The reaction is advantageously carried out in the presence of a solvent or diluent being inert to the reacting components at increased temperature.

Our invention is further illustrated by the following examples, but is not limited to the specific processes and compounds described therein:

*Example 1*

A solution of 14.4 grams of 6-amino quinoline in 200 ccs. of alcohol is mixed with 15 grams of potassium carbonate and thereafter gradually with 20 grams of meta-nitro-para-toluyl-chloride. The precipitate formed is sucked off, washed with water in order to remove adherent potassium carbonate and potassium chloride, and thereafter recrystallized from alcohol or dioxane. Thus, 6-(meta-nitro-para-toluyl-amino)-quinoline is obtained in the form of a whitish powder of the melting point of 214° C.

In order to obtain the quaternary salt, 30 grams of the 6-(meta-nitro-para-toluylamino)-quinoline are heated with 15 grams of dimethylsulfate at a temperature of 120° C. for one hour in the presence of about 100 ccs. of nitrobenzene or chlorobenzene, while stirring.

The 6 - (meta - nitro - para - toluylamino) -N- methylquinolinium - methylsulfate formed is sucked off, washed with alcohol and ether and recrystallized from dilute alcohol. It is a water-soluble, light yellow crystalline powder of the melting point of 203° C. to 204° C. It has the following probable formula:

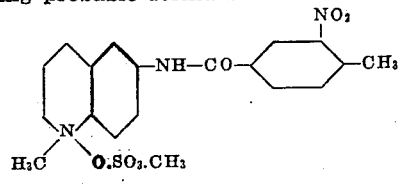

This N - methylquinolinium - methylsulfate is transformed into the corresponding N-methylquinoliniumchloride by dissolving the former in a small quantity of hot water and precipitating the chloride by the addition of a saturated aqueous sodiumchloride solution. The 6-(meta-nitro-para-toluylamino)-N- methylquinolinium - chloride melts after recrystallizing from dilute alcohol at 260.5° C. It is likewise a water-soluble, light yellow crystalline powder.

When using in the above process instead of sodiumchloride solution a sodiumbromide solution, the corresponding N-methylquinolinium-bromide displaying analogous properties as the chloride is obtained.

The above described chloride can also be obtained by condensation of 6-amino-methyl-quinoliniumchloride or—methylsulfate with meta-nitro-para-toluylchloride in aqueous or aqueous alcoholic solution in the presence of sodium acetate and by precipitation of the reaction product by means of a sodiumchloride solution.

In an analogous manner may be obtained the 7-(meta-nitro-para-toluylamino)-N-methyl-quinolinium-methylsulfate of the melting point of 210° C. and the corresponding N-methylquinoliniumchloride of the melting point of 234° to 235° C. (while decomposing), the 3-(meta-nitro-para-toluylamino)-N-methylquinaldinium-methylsulfate of the melting point of 178° C. and the corresponding N-methylquinaldiniumchloride of the melting point of 145° to 147° C., the 6-(meta-nitro-para-toluylamino)-N-ethylquinolinium-para-toluene-sulfonate (using para-toluenesulfonic acid ethyl ester as the alkylating agent) of the melting point of 229° to 230° C., the 6-(ortho-chloro-para-nitrobenzoylamino)-N-methylquinolinium-methylsulfate of the melting point of 238° to 239° C., the 6-(meta-nitro-para-toluylamino)-N-benzylquinoliniumchloride of the melting point of 216° to 218° C. and the 6-(meta-nitro-para-toluylamino)-N-(beta-oxopropyl)-quinoliniumchloride of the melting point of 233° C. (while decomposing), (using monochloroacetone as the alkylating agent). All these compounds are whitish to yellowish water-soluble crystalline powders.

In accordance with the above directions 6-(ortho-bromo-para-chlorobenzoylamin)-N-methylquinolinium-methylsulfate of the melting point of 245° to 246° C. may be prepared by reacting upon 6-aminoquinoline with ortho-bromo-para-chlorobenzoylchloride (yellow oil, boiling at 109° C. under 4 mm. pressure) and methylating the 6-(ortho-bromo-para-chlorobenzoylamino)-quinoline of the melting point of 246° to 248° C. formed with dimethylsulfate.

6-(ortho-phenoxy-para-chlorobenzoylamino)-N-methylquinolinium-methylsulfate forming light yellow crystals of the melting point of 221° C. is obtained in a similar manner by reacting upon 6-aminoquinoline with ortho-phenoxy-para-chlorobenzoylchloride (melting point 88° to 90° C.) and methylating the 6-(ortho-phenoxy-para-chlorobenzoylamino)-quinoline of the melting point of 171° C. formed by means of dimethyl-sulfate. 6-para-n-butyloxy-benzoylamino)-N-methyl-quinolinium-methylsulfate forming white needles of the melting point of 195° C. is obtained by reacting upon 6-aminoquinoline with para-n-butyloxy-benzoylchloride (boiling at 152° to 154° C. under a pressure of 6.5 mm.) and methylating the 6-(para-n-butyloxy-benzoylamino)-quinoline of the melting point of 154° C. formed by means of dimethylsulfate.

The above methylsulfate compounds may be transformed into the corresponding chlorides or bromides in the above indicated manner.

In an analogous manner 6-(meta-nitro-benzoyl-amino)-N-methylquinoliniumchloride is prepared in the form of a water-soluble yellowish crystalline product melting at 250° to 251° C.

By reacting with 1 mol. of phosphorus pentasulfide upon 1 mol. of 6-meta-nitro-para-toluylamino)-quinoline in chlorobenzene at a temperature of 80° to 100° C. for 6 hours the 6-(meta-nitro-para-thiotoluylamino)-quinoline is obtained, being a weakly yellow compound, insoluble in water. By reacting with dimethylsulfate the corresponding quaternary compound of the probable formula:

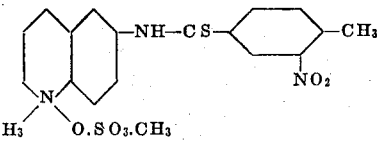

is obtained from the 6-(meta-nitro-para-thiotoluylamino)-quinoline, representing after recrystallization from alcohol a yellow crystalline powder, being soluble in water.

7-(meta-diethylaminoethylamino-para-toluylamino)-quinoline-bis-chloromethylate is obtained in the form of water-soluble crystals of the melting point of 95° to 100° C. by reacting upon 7-(meta-amino-para-toluylamino)-quinoline of the melting point of 190° C. with diethylaminoethylchloride, methylating the 7-(meta-diethylaminoethylamino-para-toluylamino)-quinoline of the melting point of 137° to 142° C. formed by means of dimethylsulfate and treating the quaternary methylsulfate obtained after solution in a small quantity of methylalcohol with alcoholic hydrochloric acid.

The said compound has probably the following formula:

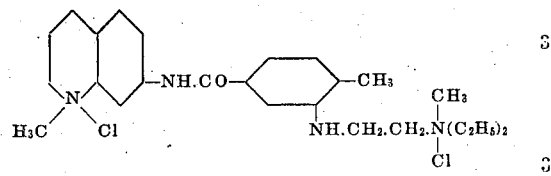

When using in the above process instead of diethylaminoethylchloride, for example, dimethylamino-ethylchloride, diethylaminobutylchloride, alpha-diethyl-amino-delta-pentylchloride, alpha-gamma-bis-diethyl-amino-beta-propylchloride or N-piperidylethylchloride, analogous compounds displaying similar properties are obtained.

*Example 2*

20 grams of 6-(meta-nitro-para-toluylamino)-N-methyl-quinolinium-methylsulfate are introduced into a boiling mixture of 300 ccs. of water, 40 grams of iron powder and 2 ccs. of glacial acetic acid. The mixture is boiled for one hour and then sucked off while hot. 6-(meta-amino-para-toluylamino)-N-methyl-quinoliniumchloride precipitates from the filtrate after the addition of saturated aqueous sodium chloride solution. It is dissolved in a small quantity of water. Alcoholic hydrogenchloride is introduced into the cooled solution. The 6-(meta-amino-para-toluylamino)-N-methylquinoliniumchloride-hydrochloride formed is, after recrystallizing from dilute alcohol, a white crystalline powder of the melting point of 269° to 271° C. which is readily soluble in water.

The corresponding N-acetyl compound may be prepared for example in the following manner: 65 grams of 6-(meta-nitro-para-toluylamino)-quinoline are gradually introduced into a boiling mixture of 700 ccs. of water, 300 ccs. of dioxane, 160 grams of iron powder and 10 grams of glacial acetic acid. The mixture is boiled for 4 hours while vigorously stirring and is then, after cooling and mixing with an excess of potassium carbonate, sucked off. The precipitate obtained is extracted with acetone. The residue obtained after evaporating the acetone from the extract is dissolved in dilute hydrochloric acid. Sodium acetate solution is added, if necessary after previous filtration, whereupon an acetic acid solution is obtained. The 6-(meta-amino-para-toluylamino)-quinoline precipitated is sucked off, washed with water and recrystallized from alcohol. It forms a white crystalline powder of the melting point of 209° C. It is transformed into the corresponding acetyl compound of the melting point of 235° C., and the latter is methylated by means of dimethyl-sulfate according to the directions described in Example 1. The 6-(meta-acetylamino-para-toluylamino)-N - methylquinolinium-methylsulfate thereby obtained is after recrystallizing from dilute alcohol a white, water-soluble crystalline powder of the melting point of 233° to 234° C. (while decomposing). It is transformed into the corresponding N-methylquinoliniumchloride of the melting point of 264° to 266° C. (while decomposing) in the manner described above.

The 6-meta-(meta'-chlorobenzoylamino)-para-toluylamino-methylquinoliniumchloride of the probable formula:

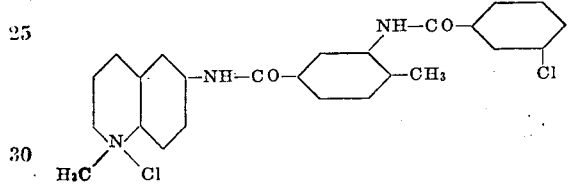

forming after recrystallizing from dilute alcohol a white water-soluble crystalline powder of the melting point of 254° C., is obtained by reacting upon a solution of 5 grams of 6-(meta-amino-para - toluylamino) - N - methylquinoliniumchloride-hydrochloride in 200 ccs. of water with a solution of 2.5 grams of meta-chloro-benzoylchloride in a small quantity of acetone in the presence of 20 ccs. of an aqueous 50% sodium acetate solution, and precipitating the reaction product by means of sodium chloride solution.

In an analogous manner instead of the chlorobenzoylamino compound the corresponding benzoyl-amino compound is obtainable displaying analogous properties.

When using in the above reaction a derivative of a dibasic acid as acylating agent, two molecules of the quarternary compound of the above characterized kind may be combined with each other. For example, when reacting upon 6-(meta-amino-para-toluylamino)-quinoline with carbonyl chloride in dilute acetic acid solution and in the presence of sodium acetate, two molecules of the 6-(meta-amino-para-toluylamino)-quinoline are combined with each other by a —CO—group attached to the amino groups, forming a urea-like grouping. This urea derivative of the melting point of 254° to 256° C, can be transformed by the action of dimethylsulfate in the presence of nitrobenzene into the corresponding quaternary salt, forming after recrystallizing from dilute alcohol a white crystalline powder of the melting point of 260° C. which is soluble in water. The corresponding methylquinoliniumchloride compound, having probably the following formula:

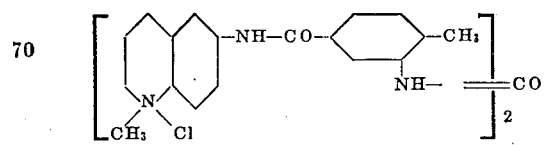

is likewise readily soluble in water and decomposes gradually when heated at a temperature of above 250° C.

The same compound may be prepared by reacting upon 6-(meta-amino-para-toluylamino)-methyl-quinoliniumchloride-hydrochloride with carbonyl-chloride in acetic acid solution and precipitating the reaction product by means of sodium chloride solution. The same compound is further obtainable by condensation of 6-amino-methyl-quinoliniumchloride-hydrochloride with 1.1'-dimethyl-2.2'-diphenylurea - 4.4'- dicarboxylic acid chloride in aqueous or aqueous-alcoholic solution in the presence of sodium acetate, and precipitating the reaction product by means of sodium chloride.

*Example 3*

5-(meta-nitro-para-toluylamino) - N - methyl-isoquinoliniummethylsulfate forming whitish, water-soluble crystals of the melting point of 228° to 229° C. is obtained by reacting upon 5-aminoisoquinoline with an equimolecular quantity of meta-nitro-para-toluylchloride and methylating the 5-(meta-nitro-para-toluylamino)-isoquinoline of the melting point of 191° C. formed by means of dimethylsulfate in accordance with the directions of Example 1.

*Example 4*

Bz-amino - ortho - phenanthroline is transformed by the action of an equimolecular quantity of meta-nitro-para-toluylchloride into Bz-(meta - nitro - para - toluylamino) -ortho-phenanthroline of the melting point of 273° to 274° C. The latter is converted into the water-soluble Bz-(meta - nitro -para-toluylamino)-N-methyl-ortho-phenanthrolinium-methylsulfate of the melting point of 227° to 228° C. (while decomposing) by means of dimethylsulfate as described above. It has the following probable formula:

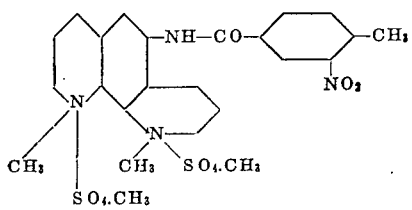

*Example 5*

A solution of 2 grams of 2-aminoquinoline in 100 ccs. of dry ether is slowly mixed with a solution of 2.8 grams of meta-nitro-para-toluylchloride and 20 ccs. of ether, while cooling. When the reaction is complete, the mixture is filtered and the ether evaporated. The residue is recrystallized from alcohol and then methylated by means of dimethylsulfate. The 2-(meta-nitro-para-toluylamino)-N - methylquinolinium-methylsulfate thus obtained melts, after recrystallizing from alcohol and some water, at 215° C.

The same compound can be obtained when 2-chloro - N - methylquinolinium - methylsulfate is caused to react upon meta-nitro-para-toluyl-amide.

*Example 6*

A mixture of equimolecular quantities of phthalic anhydride and 6-aminoquinoline are heated at 150° to 160° C. for 4 hours and then at 180° C. for 2 hours. The reaction mass is then triturated with potassium carbonate solution and the mixture obtained is sucked off. From the alkaline filtrate the 6-(ortho-carboxylbenzoylamino)-quinoline of the melting point of 227° C.

(while decomposing) precipitates on acidifying with dilute acetic acid. From the residue insoluble in the potassium carbonate solution the 6-phthalimidoquinoline of the melting point of 225° C. is obtained. The said compounds are transformed by means of dimethylsulfate in the usual manner into the 6-(ortho-carboxylbenzoylamino) - N - methylquinolinium-methylsulfate of the melting point of 268° to 270° C. and into the 6-phthalimido- N-methylquinolinium-methylsulfate of the melting point of 243° C. The said compounds have the following formula, respectively:

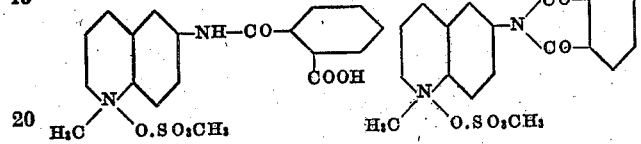

While we have described our invention in great detail and with respect to preferred forms and embodiments thereof, we do not desire to be limited to such details, forms and embodiments, since as explained above it is obvious for those skilled in the art that many changes and modifications may be made and the invention embodied in other forms without departing from the spirit and scope thereof in its broader aspects. We, therefore, desire to cover all forms and modifications of any one or more of the appended claims.

We claim:

1. The process which comprises reacting upon a compound of the general formula:

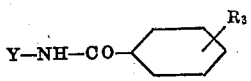

wherein Y stands for a quinoline ring, N being attached to a ring carbon atom of the quinoline ring representing Y, $R_3$ stands for at least one substituent selected from the group consisting of alkyl, alkoxy, phenoxy, halogen, hydroxy, nitro, amino, acylamino, aminoalkylamino and carboxyl groups with an alkylating agent, while heating.

2. The process which comprises reacting upon a compound of the general formula:

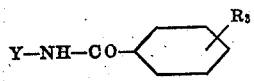

wherein Y stands for a quinoline ring, N being attached to a ring carbon atom of the quinoline ring representing Y, $R_3$ stands for at least one substituent selected from the group consisting of alkyl, alkoxy, phenoxy, halogen, hydroxy, nitro, amino, acylamino, aminoalkylamino and carboxyl groups with a dialkylsulfate, while heating.

3. The compounds of the general formula:

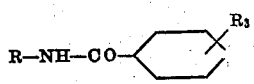

wherein R stands for a quaternary quinoline ring system and $R_3$ stands for at least one substituent of the group consisting of alkyl, alkoxy, phenoxy, halogen, hydroxy, nitro, amino, alkylamino, aminoalkylamino, acylamino and carboxyl groups, said compounds being white to yellowish crystalline products, soluble in water and mono- and polyvalent liquid alcohols, slightly soluble in benzene, nitro-benzene, ether and chloroform, being characterized by a therapeutic action on blood parasites.

4. The compounds of the general formula:

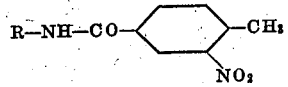

wherein R stands for a quaternary quinoline ring system, which compounds are white to yellowish crystalline products, soluble in water and mono- and polyvalent liquid alcohols, slightly soluble in benzene, nitro-benzene, ether and chloroform, being characterized by a therapeutic action on blood parasites.

5. The compounds of the general formula:

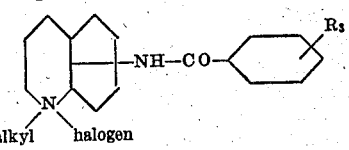

wherein $R_3$ stands for at least one substituent of the group consisting of alkyl, alkoxy, phenoxy, halogen, hydroxy, nitro, amino, alkylamino, aminoalkylamino, acylamino and carboxyl groups, which compounds are white to yellowish crystalline products, soluble in water and mono- and polyvalent liquid alcohols, slightly soluble in benzene, nitrobenzene, ether and chloroform, being characterized by a therapeutic action on blood parasites.

6. The compounds of the general formula:

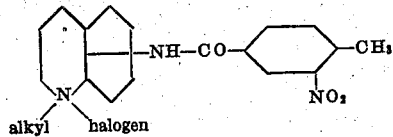

which compounds are white to yellowish crystalline products, soluble in water and mono- and polyvalent liquid alcohols, slightly soluble in benzene, nitro-benzene, ether and chloroform, being characterized by a therapeutic action on blood parasites.

7. The compound of the formula:

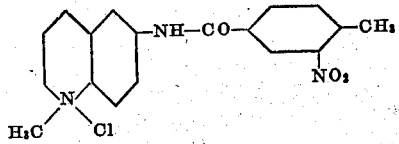

which compound forms a water-soluble light yellow crystalline powder, melting at 260–265° C.

8. The compounds of the formula:

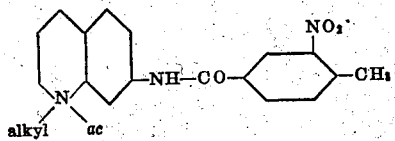

in which ac stands for a mineral acid radical, which compounds are white to yellowish crystalline products, soluble in water and mono- and polyvalent liquid alcohols, slightly soluble in benzene, nitrobenzene, ether and chloroform, being characterized by a therapeutic action on blood parasites.

9. The compound of the formula:

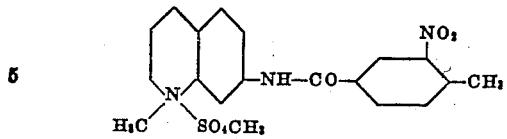

which compound forms a water-soluble light yellow crystalline powder melting at 210° C.

10. The process which comprises reacting upon a compound of the general formula:

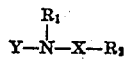

wherein Y stands for a heterocyclic ring system containing only trivalent nitrogen as a hetero member, N being attached to a ring carbon atom of the ring system representing Y, $R_1$ stands for hydrogen, alkyl, aralkyl of the benzene series or X the second free linkage of which is then connected with $R_2$, $R_2$ stands for a benzene radical which is at least once substituted by a monovalent substituent selected from the group consisting of alkyl, alkoxy, phenoxy, halogen, hydroxy, nitro, amino, alkylamino, aminoalkylamino, acylamino and carboxyl groups, and X stands for one of the groups —CO— and —CS—, which group is attached to a ring carbon atom of the benzene radical, with an alkylating agent, while heating.

11. The process which comprises reacting upon a compound of the general formula:

wherein Y stands for a heterocyclic ring system containing only trivalent nitrogen as a hetero member, N being attached to a ring carbon atom of the ring system representing Y, $R_1$ stands for hydrogen, alkyl, aralkyl of the benzene series or —CO—, the second linkage of which latter is then connected with $R_2$, $R_2$ stands for a benzene radical which is at least once substituted by a monovalent substituent selected from the group consisting of alkyl, alkoxy, phenoxy, halogen, hydroxy, nitro, amino, alkylamino, aminoalkylamino, acylamino and carboxyl groups and the —CO— group is attached to a ring carbon atom of the benzene radical, with an alkylating agent, while heating.

12. The process which comprises reacting upon a compound of the general formula:

wherein Y stands for a quinoline ring, N being attached to a ring carbon atom of the quinoline ring representing Y, $R_1$ stands for hydrogen, alkyl, aralkyl of the benzene series or X, the second free linkage of which is then connected with $R_2$, $R_2$ stands for a benzene radical which is at least once substituted by a monovalent substituent selected from the group consisting of alkyl, alkoxy, phenoxy, halogen, hydroxy, nitro, amino, alkylamino, aminoalkylamino, acylamino and carboxyl groups and X stands for one of the groups —CO— and —CS—, which group is attached to a ring carbon atom of the benzene radical, with an alkylating agent, while heating.

13. The process which comprises reacting upon a compound of the general formula:

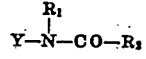

wherein Y stands for a quinoline ring, N being attached to a ring carbon atom of the quinoline ring representing Y, $R_1$ stands for hydrogen, alkyl, aralkyl of the benzene series or —CO—, the second linkage of which latter is then connected with $R_2$, $R_2$ stands for a benzene radical which is at least once substituted by a monovalent substituent selected from the group consisting of alkyl, alkoxy, phenoxy, halogen, hydroxy, nitro, amino, alkylamino, aminoalkylamino, acylamino and carboxyl groups and the —CO— group is attached to a ring carbon atom of the benzene radical, with an alkylating agent, while heating.

14. The compounds of the general formula:

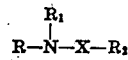

wherein R stands for a ring system containing only nitrogen as a hetero member at least one of which is in its quaternary state, N being attached to a ring carbon atom of the ring system representing R, $R_1$ stands for hydrogen, alkyl, aralkyl of the benzene series or X, the second free linkage of which is then connected with $R_2$, $R_2$ stands for a benzene radical which is at least once substituted by a monovalent substituent selected from the group consisting of alkyl, alkoxy, phenoxy, halogen, hydroxy, nitro, amino, alkylamino, aminoalkylamino, acylamino and carboxyl groups, and X stands for one of the groups —CO— and —CS—, which radical is attached to a ring carbon atom of the benzene radical, said compounds being white to yellowish crystalline products, soluble in water and mono- and polyvalent liquid alcohols, slightly soluble in benzene, nitrobenzene, ether and chloroform, being characterized by a therapeutic action on blood parasites.

15. The compounds of the general formula:

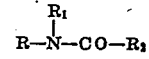

wherein R stands for a ring system containing only nitrogen as a hetero member at least one of which is in its quaternary state, N being attached to a ring carbon atom of the ring system representing R, $R_1$ stands for hydrogen, alkyl, aralkyl of the benzene series or —CO—, the second linkage of which latter is then connected with $R_2$, $R_2$ stands for a benzene radical which is at least once substituted by a monovalent substituent selected from the group consisting of alkyl, alkoxy, phenoxy, halogen, hydroxy, nitro, amino, alkylamino, aminoalkylamino, acylamino and carboxyl groups and the —CO— group is attached to a ring carbon atom of the benzene radical, said compounds being white to yellowish crystalline products, soluble in water and mono- and polyvalent liquid alcohols, slightly soluble in benzene, nitrobenzene, ether and chloroform, being characterized by a therapeutic action on blood parasites.

16. The compounds of the general formula:

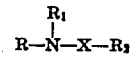

wherein R stands for a quaternary quinoline ring system, $R_1$ stands for hydrogen, alkyl, aralkyl of the benzene series, or —CO—, the second linkage of which latter is then connected with $R_2$, $R_2$ stands for a benzene radical which is at least once substituted by a monovalent substituent selected from the group consisting of alkyl, alkoxy, phenoxy, halogen, hydroxy, nitro, amino, alkylamino, aminoalkylamino, acylamino and carboxyl groups, and X stands for one of the groups —CO— and —CS—, which radical is attached to a ring carbon atom of the benzene radical, said compounds being white to yellowish crystalline products, soluble in water and mono- and polyvalent liquid alcohols, slightly soluble in benzene, nitrobenzene, ether and chloroform, being characterized by a therapeutic action on blood parasites.

17. The compounds of the general formula:

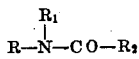

wherein R stands for a quaternary quinoline ring system, $R_1$ stands for hydrogen, alkyl, aralkyl of the benzene series or —CO—, the second linkage of which latter is then connected with $R_2$, $R_2$ stands for a benzene radical which is at least once substituted by a monovalent substituent selected from the group consisting of alkyl, alkoxy, phenoxy, halogen, hydroxy, nitro, amino, alkylamino, aminoalkylamino, acylamino and carboxyl groups, and the —CO— group is attached to a ring carbon atom of the benzene radical, said compounds being white to yellowish crystalline products, soluble in water and mono- and polyvalent liquid alcohols, slightly soluble in benzene, nitrobenzene, ether and chloroform, being characterized by a therapeutic action on blood parasites.

FRITZ SCHÖNHÖFER.
HANS HENECKA.